No. 756,461.                                                    Patented April 5, 1904.

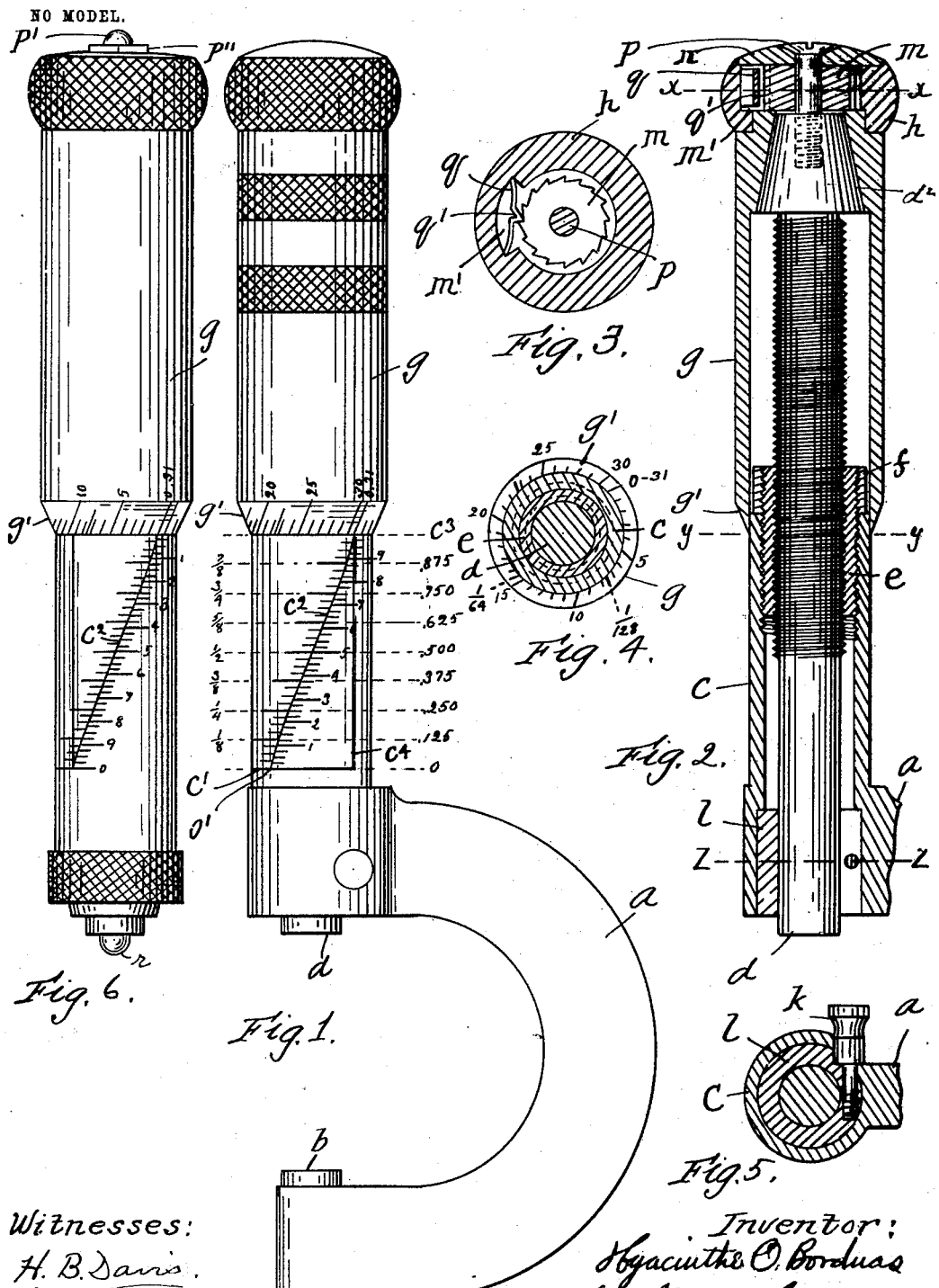

UNITED STATES PATENT OFFICE.

HYACINTHE O. BORDUAS, OF HAVERHILL, MASSACHUSETTS, ASSIGNOR OF ONE-HALF TO THEODORE L. PROVOST, OF HAVERHILL, MASSACHUSETTS.

MICROMETER-CALIPERS.

SPECIFICATION forming part of Letters Patent No. 756,461, dated April 5, 1904.

Application filed January 2, 1904. Serial No. 187,443. (No model.)

*To all whom it may concern:*

Be it known that I, HYACINTHE O. BORDUAS, of Haverhill, county of Essex, State of Massachusetts, have invented an Improvement in Micrometer-Calipers, of which the following description, in connection with the accompanying drawings, is a specification, like characters on the drawings representing like parts.

Micrometer-calipers now in general use are adapted to register on their dials only decimal parts of the unit or an inch. Inasmuch as the English measure is extensively employed, in which the unit is divided by common usage into common fractions, as one-sixteenth, one thirty-second, one sixty-fourth, &c., machinists are often occasioned much inconvenience and often make mistakes or are inaccurate in their work for the reason that they are obliged to measure the common fractions with a tool which is graduated to measure only decimal fractions—that is, to measure one-sixteenth, one thirty-second, or smaller common subdivisions of an inch with a ordinary micrometer which moves the spindle one one-thousandth of an inch for each space on the thimble it is necessary to ascertain the nearest decimal fraction to the desired measurement and then move the thimble as near to this fraction as possible by reckoning approximately the correct point between two of the graduation-marks on the thimble.

The object of my invention is to produce a micrometer-caliper or a measuring device of similar character which is adapted to register exactly and without computation the common as well as decimal fractional parts of an inch.

A further object of my invention is to provide an improved means for moving the work-engaging members of the tool into engagement with the work.

I accomplish the above-described objects by the means disclosed in the accompanying drawings, in which—

Figure 1 is a side elevation of an outside caliper provided with my invention. Fig. 2 is a central longitudinal cross-section thereof. Fig. 3 is a cross-section on the line $x\ x$ of Fig. 1. Fig. 4 is a cross-section on the line $y\ y$ of Fig. 2. Fig. 5 is a cross-section on the line $z\ z$ of Fig. 2. Fig. 6 is an elevation illustrating the application of my invention to an inside caliper.

The caliper frame or body $a$ is of usual form and is provided with the usual anvil $b$, which constitutes the stationary member of the caliper. A hollow cylindrical sleeve $c$ is rigidly secured to the frame $a$ and is adapted to receive the movable member or spindle $d$ of the caliper. The spindle has a flat work-engaging face at its lower end, and the middle portion thereof is screw-threaded, as shown in Fig. 2, and, as will be hereinafter explained, these threads must be thirty-two and eight thirty-firsts to the inch in order to accomplish conveniently the desired result already referred to. A bushing $e$ is threaded into the sleeve $c$ and is locked in a suitable position therein by means of a lock-nut $f$, which is threaded thereon and may be forced against the outer end of the sleeve. The bushing $e$ is also internally threaded to receive the threads of spindle $d$, as shown. The usual thimble $g$ is mounted on the spindle $d$ and fitted closely over the sleeve $c$, the outer end of the spindle having a conical head $d^2$, which is forced into the correspondingly-tapered bore at the end of the thimble, so that a rigid connection is provided between the thimble and spindle. The carrier end of the thimble is beveled at $g'$, so that the beveled surface thereby provided practically meets the surface of the sleeve $c$. This beveled surface $g'$, which I hereinafter term the "dial," is divided into thirty-one equal parts by suitable graduations for reasons hereinafter to be explained.

The caliper illustrated in Fig. 1 is designed to measure one inch, so that when the thimble $g$ is rotated so as to screw the spindle into contact with the anvil $b$ the edge of the dial will be moved from the cross-line $c^3$ on the sleeve, or the position of Fig. 1, to the cross-line $c'$ on the sleeve—that is, the lines $c'$ and $c^3$ are exactly one inch apart. The sleeve is provided with a helical line $c^2$, which I will term the "zero-line," which extends from a certain convenient zero-point $o$ in line $c^3$ to a zero-point $o'$ on the line $c'$, said points $o$ $o'$ when projected on the same circle being exactly eight thirty-firsts of a circumference apart. In other words, if line $c^2$ represented a screw-thread the threads would be one for each three and seven-eighths inches, or eight thirty-firsts of a thread to the inch. The sleeve is also provided with an elemental or base-line $c^4$, which extends from the zero-point $o$ in the cross-line $c^3$ parallel to the axis of the thimble. The zero-line $c^2$ is divided for convenience into equal parts by a series of graduation-lines, which are each perpendicular to the base-line $c^4$ in practice, the graduation-lines at one side of the zero-line being one thirty-second of an inch apart and the lines on the opposite side one-tenth of an inch apart. The graduation-lines on the dial are preferably inclined to correspond to the direction of the zero-line on the sleeve.

As there is a screw-threaded connection between the sleeve and thimble, the latter will move longitudinally of the sleeve when it is rotated, and as the line $c^2$ is helical it follows when the thimble is given a complete rotation only, starting with the zero-line of the dial in register with the zero-line $c^2$ of the sleeve, that these zero-lines will not then be in register, but that it will be necessary to rotate the thimble somewhat farther to bring these lines into register.

In making thirty-two complete turns of the thimble, starting with the zero-line of its dial in register with the zero-line of the sleeve at the zero-point on the base-line $c^3$, the number of spaces on the dial which will pass the base-line $c^4$ will be thirty-two times thirty-one, or nine hundred and ninety-two. When the thirty-two rotations of the thimble have been made, so that the dial zero-line is in register with the base-line $c^4$, the edge of the thimble-dial will be eight thirty-firsts of a spindle-thread from the base-line $c'$—that is, the thimble must be turned eight more spaces on the dial to move the spindle a full inch. As nine hundred and ninety-two plus eight equals one thousand, it follows that each time the thimble is turned one space from the base-line $c^4$ the spindle will be moved exactly one one-thousandth of an inch. As one hundred and twenty-five one-thousandths of an inch equals one-eighth of an inch it follows that if the thimble is rotated thirty-one and one-fourth spaces, or, for example, starting with the zero-line of the dial in register with the zero-line $c^2$ of the sleeve and rotating the thimble until its zero-line again comes into register with the zero-line of the sleeve, the spindle will be moved exactly one thirty-second of an inch. Obviously a movement of the thimble fifteen and one-half spaces on its dial with respect to the zero-line $c^2$ will move the spindle one sixty-fourth of an inch, or a like movement of the thimble seven and three-fourths spaces will move the spindle one one-hundred and twenty-eighth of an inch, and so on. For this reason I preferably provide the dial with special one sixty-fourth and one one-hundred-and-twenty-eighth marks, as indicated in Fig. 4.

The position of the spindle with relation to the anvil $b$ in decimal parts of an inch from .001 to one are also all registered on the dial as its graduations register with the base-line $c^4$, the decimals .125, .250, &c., also being measured by moving the dial zero-line into register with the zero-line $c^2$ at the proper points. The scale on the zero-line is simply used to determine the approximate position of the spindle, as is usual. By subdividing the dial-graduations one two-thousandths and other divisions of one one-thousandths may be easily measured and registered on the dial.

The bushing $e$ must be adjusted so that when the faces of the anvil and spindle are moved into contact the zero-line on the dial will register with the zero-point on the line $c'$. This method of adjustment is convenient and avoids the necessity of grinding the faces of the members after the tool has been put together, it being a simple matter to unscrew and remove the spindle and thimble, loosen the nut $f$, and then change the position of the bushing $e$.

In micrometer-calipers in general use some provision is usually made by which the movable member may be forced against the stationary member with uniform pressure, these devices being known as "ratchet-stops." So far as I am aware, a device of this character has not been produced which is adapted to be used in connection with an inside as well as an outside caliper. In connection with my caliper I provide a ratchet-stop which may be employed in both relations, which I will now describe.

A flat disk $m$, having ratchet-teeth on its periphery, is clamped between the outer end of the thimble and a convex disk $n$ by means of a screw $p$, which passes centrally through the ratchet-wheel $m$ and is threaded into the end of the spindle $d$, thereby also holding the tapered end of the latter firmly in engagement with the sleeve $g$. A ring $h$ is swiveled between the sleeve $g$ and disk $n$, so that it may turn freely. A spring-pawl $q$, having its tooth $q'$ in the middle thereof, is held in a recess $m'$, formed on the inner side of the ring $m$, its ends bearing against shoulders at each end of said recess and its tooth engaging the ratchet-teeth of the disk $m$, so that a pawl-and-ratchet connection is provided between the ring and sleeve. The operation of this device is similar to other devices of this character, the spindle being forced into engagement with the thing which is being measured by rotating the ring $h$ and the pawl slipping over the ratchet-teeth when the two members are in contact therewith. The ring $h$ is so located that the workman may turn down the spindle by the sleeve, and then without changing the position of the hand may turn the ring when the caliper members are nearly in engagement to finish the movement.

When my invention is applied to an inside caliper, the screw $p$ is provided with a rounded head $p'$ and a squared portion $p''$, to which a wrench may be applied to turn the screw. A spindle $r$ is also secured in a chuck formed on the end of the sleeve, as is usual. The manner in which the device is used will be obvious.

A split ring $l$ is provided in the body $a$ about the spindle, and a screw $k$ is threaded therein, so that when the spindle is set in a certain position it may be clamped in this position by tightening the screw $k$.

While it is possible to provide the sleeve of a micrometer-caliper with a helical line which will register common fractions with the thimble divided into twenty-five equal parts, and the spindle has forty threads to the inch, yet such an arrangement would not be practicable, as the helical line would have to encircle the sleeve eight times in one inch, making the tool so difficult to read that it could not be employed for the purpose for which it is designed. With the arrangement invented by me the helical line is on the portion of the sleeve next the user and is practically included in ninety degrees of the surface thereof, so that all portions of the helical line are in sight of the user at all times.

While I prefer for some reasons to employ the straight base-line $c^4$, it is not essential, as all decimals of one thousand may be measured on the helical line with sufficient accuracy ordinarily. I also may find it more convenient to divide the straight base-line into a series of short straight lines, which intersect and extend from the helical line at each eighth-inch point thereon.

The above-described construction, including the ratchet-stop arrangement, may be advantageously employed in a depth-gage as well as in a caliper.

Having thus described my invention, what I claim as new, and desire to secure by Letters Patent, is—

1. A measuring instrument of the character described, comprising a sleeve, a measuring-thimble having a threaded connection therewith, and having circular graduations registering with said sleeve fractional parts of the unit of one character, said sleeve having a compensating line with which said thimble registers fractional parts of the unit of a different character, substantially as described.

2. A measuring instrument of the character described, comprising a sleeve, a measuring-thimble having a threaded connection therewith and having circular graduations registering with said sleeve fractional parts of the unit of one character, said sleeve having a helical compensating line with which said thimble registers fractional parts of the unit of a different character, substantially as described.

3. A measuring instrument of the class described, comprising a sleeve having an elemental line, and a helical line on its surface, a measuring-thimble having a threaded connection with said sleeve, said thimble having a graduated dial which registers decimal fractions of the unit with said elemental line, and common fractions of the unit with said helical line, substantially as described.

4. A measuring instrument of the character described comprising a sleeve having an elemental line and a helical line, extending longitudinally from the same point a distance representing the unit, a measuring-thimble having a threaded connection with said sleeve and having a regular series of circular graduations registering decimal parts of the unit with said elemental line, and common fractional parts thereof with said helical line, substantially as described.

5. In a micrometer, a sleeve having a helical line thereon, a thimble having a threaded connection with said sleeve having a circular dial divided into equal spaces by graduation-lines, rotation of the thimble with relation to the sleeve for any one of said spaces indicating longitudinal movement of the thimble .001 of an inch, one of said graduation-lines registering with said helical line, each time the thimble is rotated with relation thereto, longitudinal movement of the thimble a common fraction of the unit, substantially as described.

6. A measuring instrument of the class described, comprising the sleeve having a helical line thereon extending longitudinally thereof a distance representing the unit, and circularly thereof eight thirty-firsts of the circumference, a thimble telescoping with said sleeve and having a dial on its telescoping end divided into thirty-one equal parts by graduation-lines, and a screw-thread connection between said sleeve and thimble having thirty-two and eight thirty-first threads to the unit, for the purpose set forth.

7. In a micrometer measuring instrument having a sleeve, a spindle threaded therein, a thimble telescoping with said member and mounted on the outer end of said spindle, a ratchet-wheel on the outer end of said thimble arranged axially thereof, a clamping-disk on said wheel, a screw passing through said disk and wheel and threaded in said spindle, a ring encircling said wheel and swiveled between said disk and thimble, and a spring-actuated pawl borne by said ring on its inner periphery and engaging the teeth of said wheel, substantially as described.

8. An inside micrometer-caliper comprising a sleeve, a spindle threaded therein, a thimble rigidly mounted on the outer end of said spindle, a ratchet-wheel axially arranged on the outer end of said thimble, and having peripherally-arranged teeth, a clamping-disk on the outer side of said wheel, a screw passing through said disk and wheel, and threaded in said spindle, said screw having a rounded head to provide a work-engaging portion, a ring swiveled between said disk and thimble, and a spring-actuated pawl on the inner periphery of said ring engaging the teeth of said wheel, substantially as described.

In testimony whereof I have signed my name to this specification in the presence of two subscribing witnesses.

HYACINTHE O. BORDUAS.

Witnesses:
LOUIS H. HARRIMAN,
H. B. DAVIS.